United States Patent [19]

Blum

[11] 4,061,354
[45] Dec. 6, 1977

[54] STRUCTURAL UNIT FOR SWINGARMS

[75] Inventor: John Tudor Blum, Gardena, Calif.

[73] Assignee: Cross Up, Inc., Wilmington, Calif.

[21] Appl. No.: 732,669

[22] Filed: Oct. 15, 1976

[51] Int. Cl.² ............................................. B62K 19/04
[52] U.S. Cl. ............................. 280/288; 29/DIG. 47;
138/111; 138/DIG. 11; 428/598; 428/603
[58] Field of Search ............... 280/284, 288; 138/111,
138/177, DIG. 11; 428/598, 599, 595, 603;
29/DIG. 47

[56] References Cited

U.S. PATENT DOCUMENTS

| 1,045,957 | 12/1912 | Dicks | 138/111 |
| 1,141,067 | 5/1915 | Lloyd | 138/111 |
| 1,262,786 | 4/1918 | Harley | 280/288 |
| 1,382,607 | 6/1921 | Rathbone | 428/598 |
| 2,347,957 | 5/1944 | McCullough | 29/DIG. 47 |
| 2,433,631 | 12/1947 | Sherman | 280/288 |

FOREIGN PATENT DOCUMENTS

| 1,038,505 | 9/1953 | France | 280/284 |
| 16,097 of | 1891 | United Kingdom | 428/595 |

Primary Examiner—Joseph F. Peters, Jr.
Assistant Examiner—Jack D. Rubenstein
Attorney, Agent, or Firm—Perry E. Turner

[57] ABSTRACT

A motorcycle swingarm is shown in which each arm is an extrusion of lightweight metal which in cross-section is a diamond with a cross rib and integral upper and lower fins. The upper fin is the larger, and is shaped to taper from both ends. The arms are bent slightly intermediate their ends, and at one end have a sleeve bearing welded thereto. At such one end, arcuate plates are also located between the arms and welded to them. At their other ends, each arm is slotted to receive an oblong slotted block which is welded to the arm. Also, the arms intermediate their ends have tabs welded thereto for providing connection points for shock absorbers and chain tensioners.

3 Claims, 6 Drawing Figures

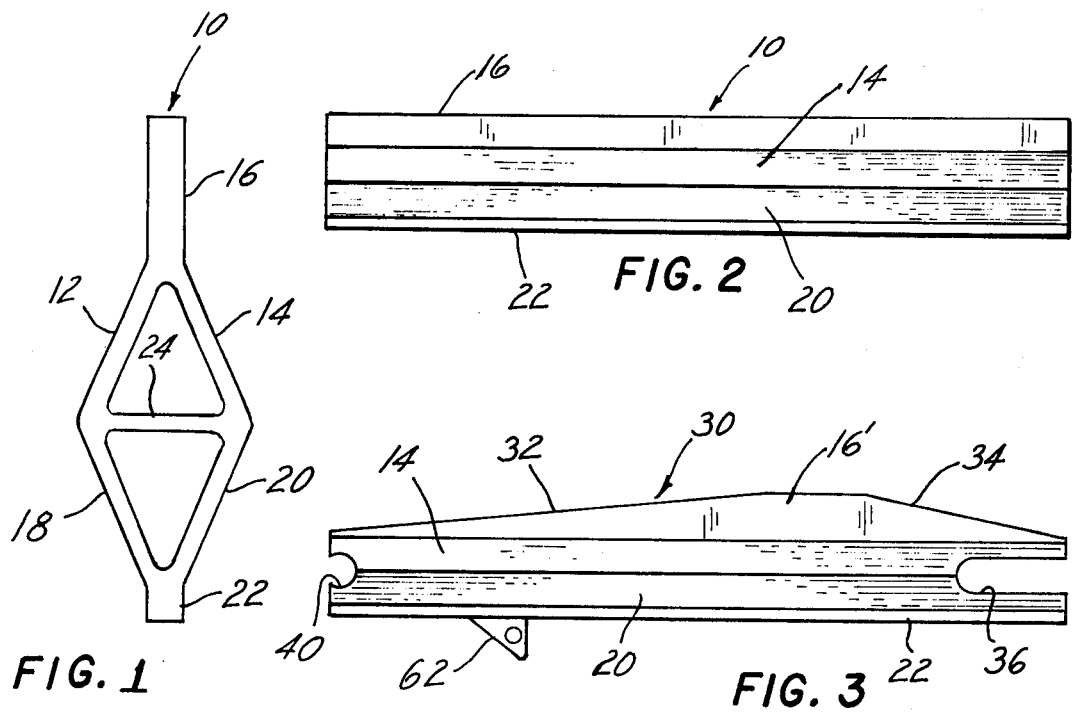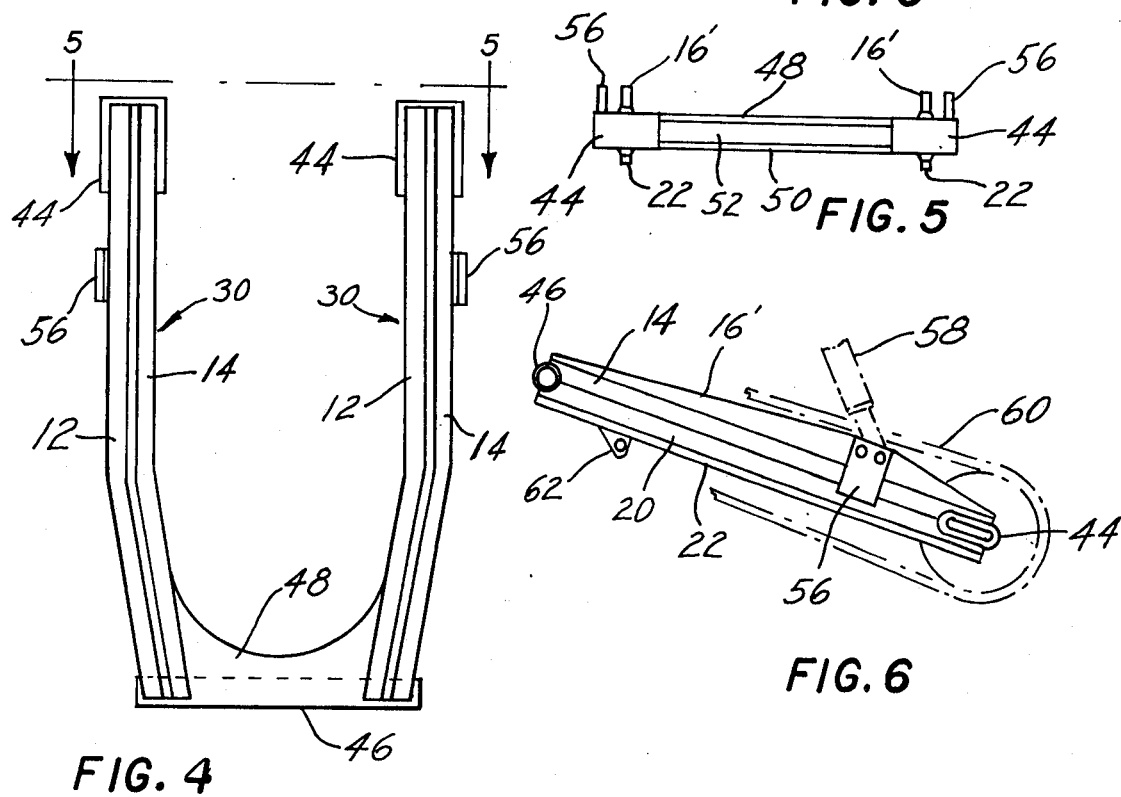

1

STRUCTURAL UNIT FOR SWINGARMS

BACKGROUND OF THE INVENTION

1. Field of the Invention

This invention relates to structures for motorcycle swingarms and the like.

2. Description of the Prior Art

As is well known, the swingarm of a motorcycle undergoes considerable stress under certain conditions. Thus, the ends of the arms of the swingarm are subjected to torquing during sharp turns and skids, and particularly in rough terrain. In swingarm structures heretofore known, the resultant stresses are manifested in structural failures at various points, e.g., the ends of the arms and the junctions of the arms and the curved yokes to which they are welded.

Typically, known swingarms have two arms formed of steel tubes of rectangular or circular cross-section, which at one end are welded to the ends of the legs of a curved or generally U-shaped yoke member. The yoke has a transverse bore, which may be constituted of a bearing sleeve welded to the yoke, to facilitate mounting the swingarm on a pin secured to the frame of the motorcycle. The pin on which the swingarm pivots is forward of the rear wheel, with the arms straddling the wheel and the yoke being clear of the wheel. The rear ends of the arms have weld connections to the ends of respective short, slotted plates which are secured to the ends of the rear axle.

The slotted plates may be made of laminated steel sheets, and such plates readily tear and/or bend after repeated stressing. Further in this regard, repeated stressing of known swingarms shows up as fractures at the junctures of the arms and the ends of the yoke; fractures at the junctures of the arms and the slotted plates; and bending and/or collapsing of the arms and slotted plates. Also, the ends of the tubular arms readily compress and bend when the chain is derailed and catches the shock mount following loosening of the axle. Loosening of the axle nut occurs with vibrations, and compressing of the slotted plates secured to the axle, permitting the shock mount to be caught be the chain and resulting in bending of the axle and the tubular arms.

SUMMARY OF THE INVENTION

This invention embraces a swingarm structure in which the arms are extruded members which in cross-section are diamond shaped with a cross web and upper and lower ribs or fins. Also embraced are such arms in a swingarm in which there are eliminated welds to the ends of a yoke, but wherein the sides of the arms at one end are welded to the sides of a curved yoke, and in which a bearing sleeve is welded to the ends of the arms and along the back of the yoke. Further embraced are slotted bars nested and welded at one end in mating notches or grooves in the opposite ends of the arms, whereby the bars are welded to the confronting edges of the sides and crosswebs of the arms, and along their upper and lower surfaces to the sides and confronting edges of the cross-sections of the arms. Still further embraced is such a swingarm with tabs, nuts or plates welded thereto for facilitating connections of shock absorbers, chain tensioners and the like to the frame of the vehicle.

BRIEF DESCRIPTION OF THE DRAWING

FIG. 1 is an end view of an arm extrusion of the invention from which the arms of a swingarm are formed;

FIG. 2 is a side elevation view of the extrusion of FIG. 1;

FIG. 3 is a side elevation view like FIG. 2 but with the upper fin shaped for an arm of a motorcycle swingarm, with cutouts in the ends of the arm for other parts, and a tab welded to the bottom fin for use with a chain tensioner;

FIG. 4 is a top plan view of a swingarm made with two of the arms of FIG. 3, showing a bearing sleeve welded to ends of the arms at one end and to a curved yoke member, oblong slotted bars welded into the other ends of the arms, and side tabs welded to the outer surfaces of the arms for use in securing the lower ends of shock absorbers to the swingarm;

FIG. 5 is an end view of the swingarm as seen along the line 5—5 of FIG. 4; and

FIG. 6 is a side elevation view of the swingarm in position, showing in phantom the chain and a shock mount to aid in understanding the invention.

DESCRIPTION OF PREFERRED EMBODIMENT

Referring to FIGS. 1 and 2, the basic structural member in accordance with this invention is an extrusion 10 which is preferably a light weight metal alloy, e.g., aluminum alloy 6061 T6. Unlike steel tubing, the extrusion 10 is formed throughout as a member having the cross-section of a diamond center with upper legs 12, 14 joined to an upper fin or rib 16, the lower legs 18, 20 joined to a lower fin or rib 22, and a crossweb 24 joined at its edges to the legs at the centers of the obtuse angles of the diamond.

For a motorcycle swingarm, the upper fin 16 is wider than the lower fin 22. As best seen with reference to FIG. 3, an arm 30 is formed from such extrusion by shaping a length thereof with the upper fin tapered at 32, 34 towards the ends, with one tapered portion being much the shorter. At the end of the short tapered portion (the right end in FIG. 3), the arm has a notch 36 formed therein. The notch has upper and lower portions in the body of the diamond, i.e., the notch is wholly confined to the diamond body and does not extend into either fin.

At the opposite end of the arm 30, an arcuate notch 40 is formed within the diamond body. In this example, the notch 40 is more than a semicircle in its perimeter. If desired, such a notch may be formed as a semicircle in cross-section; and if desired, a circular opening may be formed instead of a notch.

Referring to FIGS. 4-6 along with FIGS. 1-3, a swingarm is formed of two of the arms 30. At the ends wherein the oblong notches are formed, each arm has an oblong slotted bar 44 seated and welded into the arm. Since the notches in which the bars 44 are seated are wholly within the diamond body, it will be seen that the portions of the bars within the notches are abutting and welded to confronting edges of the sides 12, 14, 18, 20. Also, the inner end of each bar 44 at its center is abutting and welded against the crossweb 24. Also, the bars 44 are solid metal members. Thus, rather than an end to end welding of arms and slotted bars, this invention insures optimum metal-to-metal contact and welding of bars and arms together, and a construction which is not a contributing factor to axle nut loosening and consequent damages as is experienced with swingarm contructions heretofore known.

Also referring to FIG. 4 and FIG. 6, the arms 30 are intimately integrated with each other via a sleeve bearing 46, the portions of which adjacent its ends are seated in the arcuate notches in the ends of the arms 30 and welded to the arm portions confronting the bearing. Here again, all portions of the sleeve bearing encircled by the notches are in metal to metal contact with and welded to confronting edges of the sides and crossweb so as to optimize the extent to which the welded parts are integrated.

Further, the portion of the sleeve bearing 46 extending between the arms 30 is welded to upper and lower curved plates 48, 50 (see FIGS. 4 and 5). The plates 48, 50 are welded at their edges to the sides of the arms 30. Also as shown in FIG. 5, a center curved plate 52 is welded at upper and lower edges to the upper and lower plates 48, 50. Thus, the curved plates 48, 50, 52 form a yoke member which does not have any end to end welded junctions capable of ready failure. Rather, the yoke has optimum metal-to-metal contact and welded junctions along their edges which confront the sides of the arms 30. Also, this construction integrates the yoke, arms and bearing to provide a structure of such strength and rigidity as to avoid the damages readily caused swingarms heretofore known.

Again referring to FIG. 4, the arms 30 are bent intermediate their ends, and adjacent the yoke end of the swingarm, so as to be convergent, to facilitate the desired shape of swingarm to be pivoted to the frame via the bearing 46. Further, as will be seen in FIG. 6, along with FIG. 4, tabs 56 are welded to the arms, the lower ends of the tabs being welded to the outer, lower sides of the arms, and the upper ends of the tabs being spaced from the upper ribs 16' to provide space for the lower ends of shock mounts 58 shown in phantom. Also shown in phantom is the chain 60, for which one arm has a tab 62 welded to the lower fin 22 for use in attaching a chain tensioner (not shown).

While a swingarm of this invention is subjected to torquing action as with previously known swingarms, it has been found that a swingarm of the invention, although approximately 30% lighter by weight than known swingarms, is substantially stronger and is not subject to the fractures and failures of such previously known swingarms.

I claim:

1. A motorcycle swingarm structural member comprising:
   an extruded member of predetermined length,
   said member throughout its length having a central body portion which in cross-section is a diamond with a crossweb connecting the obtuse angles thereof,
   and respective fins integral with and extending the lengths of the acute angles of said member.

2. The combination of claim 1, including a pair of said members,
   said members at one end having respective elongated slots therein;
   a respective oblong slotted bar seated in said elongated slots,
   each bar being welded to said members along all confronting portions;
   a sleeve bearing,
   said members at their opposite ends having respective arcuate notches therein, said sleeve bearing having portions adjacent its ends seated in said arcuate notches and welded to said members;
   and a yoke member located between said members adjacent their opposite ends,
   said yoke member being welded along its sides to said members, and said bearing being welded to said yoke member.

3. The combination of claim 2, wherein said elongated slots and said arcuate notches are wholly confined in said central body portions of said members.

* * * * *